(12) United States Patent
Hong et al.

(10) Patent No.: US 11,725,126 B2
(45) Date of Patent: Aug. 15, 2023

(54) MULTILAYER ADHESIVE TAPE

(71) Applicant: LG Chem, Ltd., Seoul (KR)

(72) Inventors: Jae Sung Hong, Daejeon (KR); Dong Hoon Lim, Daejeon (KR); Ju Yong Seo, Daejeon (KR); Jun Man Choi, Daejeon (KR); Woo Yeon Kim, Daejeon (KR); Ho Kyung Song, Daejeon (KR); Jang Soon Kim, Daejeon (KR); Sle Lee, Daejeon (KR); Kwang Su Seo, Daejeon (KR)

(73) Assignee: Koza Novel Materials Korea Co., Ltd.

( * ) Notice: Subject to any disclaimer, the term of this patent is extended or adjusted under 35 U.S.C. 154(b) by 768 days.

(21) Appl. No.: 16/603,429

(22) PCT Filed: May 18, 2018

(86) PCT No.: PCT/KR2018/005713
§ 371 (c)(1),
(2) Date: Oct. 7, 2019

(87) PCT Pub. No.: WO2018/216968
PCT Pub. Date: Nov. 29, 2018

(65) Prior Publication Data
US 2020/0147939 A1    May 14, 2020

(30) Foreign Application Priority Data

May 22, 2017  (KR) .................. 10-2017-0062846

(51) Int. Cl.
*C09J 133/26* (2006.01)
*C09J 133/08* (2006.01)
(Continued)

(52) U.S. Cl.
CPC .............. *C09J 133/26* (2013.01); *C09J 7/10* (2018.01); *C09J 7/50* (2018.01); *C09J 133/064* (2013.01);
(Continued)

(58) Field of Classification Search
None
See application file for complete search history.

(56) References Cited

U.S. PATENT DOCUMENTS 5,814,685 A * 9/1998 Satake ................. C09D 11/326
525/902
7,070,051 B2 * 7/2006 Kanner ............ A61B 17/06133
206/460
(Continued)

FOREIGN PATENT DOCUMENTS

CN         1833012 A      9/2006
JP       2005054006 A     3/2005
(Continued)

OTHER PUBLICATIONS

Machine translation of JP 2017075281 A (Year: 2017).*
(Continued)

*Primary Examiner* — Frank D Ducheneaux
(74) *Attorney, Agent, or Firm* — Lerner David LLP

(57) ABSTRACT

Provided is a multilayer adhesive tape having excellent step coverage and reworkability. The multilayer adhesive tape sequentially includes: a first outer adhesive layer; an intermediate adhesive layer; and a second outer adhesive layer, in which the intermediate adhesive layer includes an intermediate adhesive polymer including: a polymerization unit of an alkyl group-containing (meth)acrylate monomer; a polymerization unit of a carboxyl group-containing monomer; and a polymerization unit of an acrylamide-based monomer.

10 Claims, 1 Drawing Sheet

(51) Int. Cl.
*C09J 133/14* (2006.01)
*C09J 7/10* (2018.01)
*C09J 7/50* (2018.01)
*C09J 133/06* (2006.01)

(52) U.S. Cl.
CPC ........... *C09J 133/08* (2013.01); *C09J 133/14* (2013.01); *C09J 2203/318* (2013.01); *C09J 2301/208* (2020.08); *C09J 2301/312* (2020.08); *C09J 2433/00* (2013.01)

(56) References Cited

U.S. PATENT DOCUMENTS

| | | | |
|---|---|---|---|
| 11,312,885 B2* | 4/2022 | Lee | C09J 133/10 |
| 2007/0059521 A1 | 3/2007 | Nakamura | |
| 2008/0206544 A1* | 8/2008 | Kim | C09J 7/10 |
| | | | 428/305.5 |
| 2013/0029147 A1 | 1/2013 | Miki et al. | |
| 2014/0209153 A1 | 7/2014 | Kwon et al. | |
| 2016/0376470 A1 | 12/2016 | Hirose et al. | |

FOREIGN PATENT DOCUMENTS

| | | |
|---|---|---|
| JP | 2013014664 A | 1/2013 |
| JP | 2013186216 A | 9/2013 |
| JP | 2017067046 A | 4/2017 |
| JP | 2017075281 A | 4/2017 |
| KR | 2013-0914360 A | 2/2013 |
| KR | 101541582 B1 | 8/2015 |
| KR | 2016-0025050 A | 3/2016 |
| KR | 2016-0096576 A | 8/2016 |
| KR | 2017-0045117 A | 4/2017 |
| WO | WO-2018004091 A1 * | 1/2018 ............ C09J 133/08 |

OTHER PUBLICATIONS

Aldrich Data Sheet (Year: 2022).*
International Search Report From PCT/KR2018/005713 dated Sep. 27, 2018.
Chinese Search Report for Application No. 201880023739.0 dated Apr. 2, 2021, pp. 1-2.

* cited by examiner

[Figure 1]
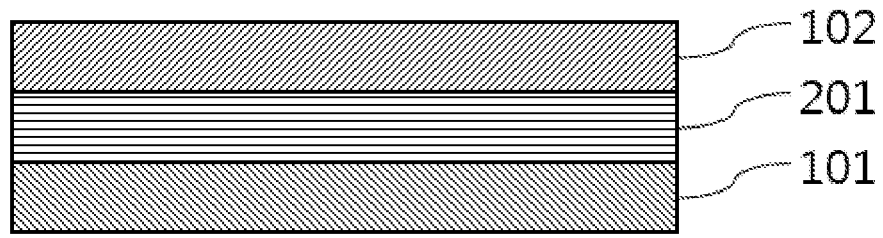
[Figure 2]
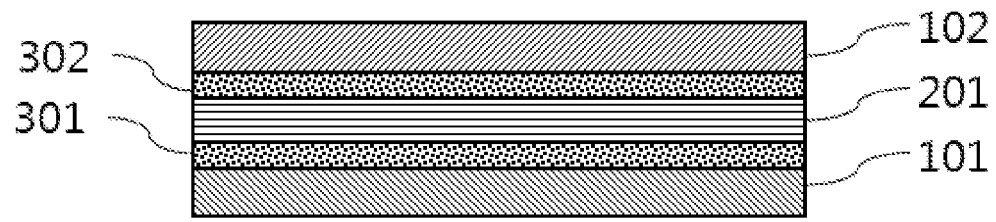

MULTILAYER ADHESIVE TAPE

CROSS-REFERENCE TO RELATED APPLICATIONS

This application is a national phase entry under 35 U.S.C. § 371 of International Application No. PCT/KR2018/005713, filed May 18, 2018, which claims priority to Korean Patent Application No. 10-2017-0062846, filed May 22, 2017 in the Korean Intellectual Property Office.

TECHNICAL FIELD

Provided is a multilayer adhesive tape.

BACKGROUND ART

Various members are attached to an electronic device by an adhesive agent. For example, various optical members such as a polarizing plate, a phase difference plate, an optical compensation film, a reflection sheet, a protection film, and a brightness-enhancing film may be attached to a liquid crystal display (LCD) by an adhesive tape. Recently, as the performance of devices using an adhesive tape has been improved, physical properties required for the adhesive tape have been gradually diversified. As an example, there is a demand for an adhesive tape which minimizes white turbidity and is excellent in reworkability in which the residue does not remain when the adhesive tape is removed for reconstruction, and there is a need for studies on the tape.

REFERENCES OF THE RELATED ART

[Patent Document]
Korean Patent Application Laid-Open No. KR 10-2016-0025050 A

DETAILED DESCRIPTION OF THE INVENTION

Technical Problem

Provided is a multilayer adhesive tape having excellent step coverage and reworkability.

Technical Solution

An exemplary embodiment provides a multilayer adhesive tape sequentially including: a first outer adhesive layer; an intermediate adhesive layer; and a second outer adhesive layer, in which the intermediate adhesive layer includes an intermediate adhesive polymer including: a polymerization unit of an alkyl group-containing (meth)acrylate monomer; a polymerization unit of a carboxyl group-containing monomer; and a polymerization unit of an acrylamide-based monomer.

Advantageous Effects

A multilayer adhesive tape according to an exemplary embodiment minimizes white turbidity and thus has high transparency.

The multilayer adhesive tape according to an exemplary embodiment is easily removed during reconstruction due to excellent reworkability.

The multilayer adhesive tape according to an exemplary embodiment has excellent step coverage.

BRIEF DESCRIPTION OF DRAWINGS

FIG. 1 is a schematic view of a lamination structure of a multilayer adhesive tape according to an exemplary embodiment.

FIG. 2 is a schematic view of a lamination structure of a multilayer adhesive tape according to an exemplary embodiment.

BEST MODE

When one member is disposed "on" another member in the present specification, this includes not only a case where the one member is brought into contact with another member, but also a case where still another member is present between the two members.

When one part "includes" one constituent element in the present specification, unless otherwise specifically described, this does not mean that another constituent element is excluded, but means that another constituent element may be further included.

In the present specification, the term "monomer polymerization unit" means a form in which the monomer forms a skeleton of the polymer, for example, a main chain or a side chain by being subjected to a polymerization reaction.

In the present specification, the unit "parts by weight" means a ratio of the weights between the respective components.

Hereinafter, the present specification will be described in more detail.

An exemplary embodiment provides a multilayer adhesive tape sequentially including: a first outer adhesive layer; an intermediate adhesive layer; and a second outer adhesive layer, in which the intermediate adhesive layer includes an intermediate adhesive polymer including: a polymerization unit of an alkyl group-containing (meth)acrylate monomer; a polymerization unit of a carboxyl group-containing monomer; and a polymerization unit of an acrylamide-based monomer.

FIG. 1 is a schematic view of a lamination structure of a multilayer adhesive tape according to an exemplary embodiment. Specifically, FIG. 1 illustrates a multilayer adhesive tape in which a first outer adhesive layer 101, an intermediate adhesive layer 201, and a second outer adhesive layer 102 are sequentially laminated.

According to an exemplary embodiment of the present invention, the multilayer adhesive tape has excellent reworkability and simultaneously may minimize white turbidity because the intermediate adhesive layer includes the intermediate adhesive polymer including both a polymerization unit of a carboxyl group-containing monomer and a polymerization unit of an acrylamide-based monomer. Specifically, the intermediate adhesive layer of the multilayer adhesive tape may have higher tensile strength than the first and second outer adhesive layers. Further, when the multilayer adhesive tape is attached to an adherend and then is detached due to the necessity of modification, the multilayer adhesive tape is not easily cut off due to the intermediate adhesive layer. Accordingly, the multilayer adhesive tape has an advantage in that the multilayer adhesive tape may be easily detached from the adherend. In addition, the first and second outer adhesive layers of the multilayer adhesive tape may have a low glass transition temperature. Therefore, the multilayer adhesive tape may have excellent step coverage.

According to an exemplary embodiment of the present invention, the content of the polymerization unit of the alkyl group-containing (meth)acrylate monomer may be 30 parts by weight or more and 90 parts by weight or less, 50 parts by weight or more and 85 parts by weight or less, 60 parts by weight or more and 80 parts by weight or less, or 70 parts by weight or more and 80 parts by weight or less, based on 100 parts by weight of the intermediate adhesive polymer.

According to an exemplary embodiment of the present invention, the carboxyl group-containing monomer may be one or more selected from the group consisting of acrylic acid, methacrylic acid, 2-carboxyethyl acrylic acid, 3-carboxypropyl acrylic acid, 2-(meth)acryloyloxy acetic acid, 3-(meth)acryloyloxy propyl acid, 4-(meth)acryloyloxy butyric acid, an acrylic acid dimer, itaconic acid, and maleic acid.

According to an exemplary embodiment of the present invention, the content of the polymerization unit of the carboxyl group-containing monomer may be 1 part by weight or more and 15 parts by weight or less. Specifically, according to an exemplary embodiment of the present invention, the content of the polymerization unit of the carboxyl group-containing monomer may be 2 parts by weight or more and 10 parts by weight or less, or 1 part by weight or more and 5 parts by weight or less, based on 100 parts by weight of the intermediate adhesive polymer.

When the content of the polymerization unit of the carboxyl group-containing monomer is within the above range, the content may be adjusted to a range in which the cohesive force of the intermediate adhesive layer is not excessively increased, and heat resistance of the intermediate adhesive layer may be secured. Furthermore, within the above range, it is possible to minimize the generation of stepped bubbles caused by lifting up near the step of the multilayer adhesive tape.

According to an exemplary embodiment of the present invention, the acrylamide-based monomer may be one or more selected from the group consisting of acrylamide, N,N-diphenyl (meth)acrylamide, N-(n-dodecyl)(meth)acrylamide, N,N-dimethyl (meth)acrylamide, N-hydroxyethyl acrylamide, N-alkyl (meth)acrylamide, N,N-dialkyl (meth)acrylamide, (meth)acrylamide, dimethylacrylamide, and N,N-diaryl (meth)acrylamide.

According to an exemplary embodiment of the present invention, the content of the polymerization unit of the acrylamide-based monomer may be 1 part by weight or more and 15 parts by weight or less. Specifically, the content of the polymerization unit of the acrylamide-based monomer may be 3 parts by weight or more and 12 parts by weight or less, based on 100 parts by weight of the intermediate adhesive polymer.

When the content of the polymerization unit of the acrylamide-based monomer is within the above range, white turbidity of the intermediate adhesive layer may be minimized, and simultaneously, the reworkability and step coverage of the multilayer adhesive tape may be improved.

According to an exemplary embodiment of the present invention, the total content of the polymerization unit of the carboxyl group-containing monomer and the polymerization unit of the acrylamide-based monomer in the intermediate adhesive polymer may be 5 parts by weight or more and 30 parts by weight or less. Specifically, the total content of the polymerization unit of the carboxyl group-containing monomer and the polymerization unit of the acrylamide-based monomer in the intermediate adhesive polymer may be 10 parts by weight or more and 25 parts by weight or less, or 10 parts by weight or more and 15 parts by weight or less, based on 100 parts by weight of the intermediate adhesive polymer.

When the total content of the polymerization unit of the carboxyl group-containing monomer and the polymerization unit of the acrylamide-based monomer is within the above range, the intermediate adhesive layer may sufficiently suppress white turbidity, and furthermore, may also aid in the improvement of the step coverage and reworkability of the multilayer adhesive tape.

According to an exemplary embodiment of the present invention, the weight ratio of the polymerization unit of the carboxyl group-containing monomer to the polymerization unit of the acrylamide-based monomer may be 1:0.1 to 1:1.8. Specifically, according to an exemplary embodiment of the present invention, the weight ratio of the polymerization unit of the carboxyl group-containing monomer to the polymerization unit of the acrylamide-based monomer may be 1:0.2 to 1:1.5.

When the weight ratio of the polymerization unit of the carboxyl group-containing monomer to the polymerization unit of the acrylamide-based monomer is within the above range, the intermediate adhesive layer may have a function of suppressing white turbidity, and may have appropriate strength. Accordingly, the step coverage of the multilayer adhesive tape may also be secured.

According to an exemplary embodiment of the present invention, the intermediate adhesive polymer may further include a polymerization unit of a cycloalkyl group-containing (meth)acrylate monomer.

According to an exemplary embodiment of the present invention, the cycloalkyl group may include a carbon ring structure in which an unsaturated bond is not present in a functional group. Further, the cycloalkyl group may include a monocyclic ring or a polycyclic ring having 3 to 20 carbon atoms.

According to an exemplary embodiment of the present invention, the cycloalkyl group-containing (meth)acrylate monomer may be one or more selected from the group consisting of cyclohexyl acrylate (CHA), cyclohexyl methacrylate (CHMA), isobornyl acrylate (IBOA), isobornyl methacrylate (IBOMA), isobornyl methyl(meth)acrylate, and 3,3,5-trimethylcyclohexylacrylate (TMCHA), but is not limited thereto.

According to an exemplary embodiment of the present invention, the content of the polymerization unit of the cycloalkyl group-containing (meth)acrylate monomer may be more than 0 part by weight and 30 parts by weight or less, or 5 parts by weight or more and 15 parts by weight or less, based on 100 parts by weight of the intermediate adhesive polymer.

In the intermediate adhesive layer, when the content of the polymerization unit of the cycloalkyl group-containing (meth)acrylate monomer is within the above range, the multilayer adhesive tape may have both appropriate attaching force and high step coverage. Further, within the content range, the reworkability of the multilayer adhesive tape may be improved. Specifically, within the content range, the strength of the multilayer adhesive tape may be appropriately maintained, and accordingly, when reconstruction is needed, the multilayer adhesive tape may be easily removed from an adherend.

In addition, within the content range, an intermediate adhesive composition may be easily applied and cured, and the generation of delayed bubbles in the intermediate adhesive layer may be minimized. Specifically, when the content of the polymerization unit of a cycloalkyl group-containing monomer is more than 30 parts by weight, delayed bubbles in the intermediate adhesive layer may be increased dramatically.

According to an exemplary embodiment of the present invention, the first outer adhesive layer and the second outer adhesive layer may each include an outer adhesive polymer including: a polymerization unit of an alkyl group-containing (meth)acrylate monomer; and a polymerization unit of a crosslinkable monomer.

According to an exemplary embodiment of the present invention, the first outer adhesive layer and the second outer adhesive layer may be formed of the same composition. Furthermore, the thicknesses of the first outer adhesive layer and the second outer adhesive layer may be the same as each other.

According to an exemplary embodiment of the present invention, in the first outer adhesive layer and the second outer adhesive layer, the content of the polymerization unit of the alkyl group-containing (meth)acrylate monomer may be 30 parts by weight or more and 95 parts by weight or less, or 50 parts by weight or more and 90 parts by weight or less, based on 100 parts by weight of the outer adhesive polymer.

According to an exemplary embodiment of the present invention, the content of the polymerization unit of the crosslinkable monomer may be 1 part by weight or more and 30 parts by weight or less based on 100 parts by weight of the outer adhesive polymer.

When the content of the polymerization unit of the crosslinkable monomer is within the above range, the multilayer adhesive tape may have improved reworkability, and furthermore, may also have durability against high temperature and high humidity because the cohesive force of the outer adhesive layer may be appropriately maintained.

According to an exemplary embodiment of the present invention, the alkyl group-containing (meth)acrylate monomer may be a (meth)acrylate having an alkyl group having 1 to 20 carbon atoms. Specifically, the alkyl group-containing (meth)acrylate monomer may be one or more selected from the group consisting of methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-methylhexyl (meth)acrylate, 2-ethylbutyl (meth)acrylate, n-octyl (meth)acrylate, and isooctyl (meth)acrylate.

According to an exemplary embodiment of the present invention, the crosslinkable monomer is a monomer having a crosslinkable functional group and another functional group capable of forming an adhesive polymer, and may mean a monomer capable of supplying a crosslinkable functional group to the adhesive polymer.

According to an exemplary embodiment of the present invention, the crosslinkable monomer may include one or more selected from the group consisting of a hydroxyl group-containing monomer, a carboxyl group-containing monomer, and a nitrogen-containing monomer. Specifically, the crosslinkable monomer may include both a hydroxyl group-containing monomer and a carboxyl group-containing monomer.

According to an exemplary embodiment of the present invention, the hydroxyl group-containing monomer may be one or more selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate, and 2-hydroxypropyleneglycol (meth)acrylate.

According to an exemplary embodiment of the present invention, the carboxyl group-containing monomer may be one or more selected from the group consisting of acrylic acid, methacrylic acid, 2-(meth)acryloyloxy acetic acid, 3-(meth)acryloyloxy propyl acid, 4-(meth)acryloyloxy butyric acid, an acrylic acid dimer, itaconic acid, and maleic acid, but is not limited thereto.

According to an exemplary embodiment of the present invention, the nitrogen-containing monomer may be one or more selected from the group consisting of 2-isocyanatoethyl (meth)acrylate, 3-isocyanatopropyl (meth)acrylate, 4-isocyanatobutyl (meth)acrylate, (meth)acrylamide, N-vinylpyrrolidone, dimethylacrylamide, and N-vinylcaprolactam, but is not limited thereto.

According to an exemplary embodiment of the present invention, the outer adhesive polymer may further include a polymerization unit of a heterocycloalkyl group-containing (meth)acrylate monomer.

According to an exemplary embodiment of the present invention, the heterocycloalkyl group may include a ring structure in which an unsaturated bond is not present and a heteroatom other than carbon is included in the functional group. Furthermore, the heterocycloalkyl group may include a structure in which one or more carbon atoms are substituted with a heteroatom in a structure of a monocyclic ring or a polycyclic ring having 3 to 20 carbon atoms.

According to an exemplary embodiment of the present invention, the heterocycloalkyl group-containing (meth)acrylate monomer may be one or more selected from the group consisting of tetrahydrofurfuryl acrylate (THFA), tetrahydrofurfuryl methacrylate, tetrahydropyranyl acrylate (THPA), acryloyl morpholine, and cyclictrimethylol-propaneformalacrylate (CTFA).

According to an exemplary embodiment of the present invention, the content of the polymerization unit of the heterocycloalkyl group-containing (meth)acrylate monomer may be 1 part by weight or more and 15 parts by weight or less. Specifically, according to an exemplary embodiment of the present invention, the content of the polymerization unit of the heterocycloalkyl group-containing (meth)acrylate monomer may be 5 parts by weight or more and 15 parts by weight or less, based on 100 parts by weight of the outer adhesive polymer.

According to an exemplary embodiment of the present invention, the intermediate adhesive polymer may be formed by solution-polymerizing a composition including an alkyl group-containing (meth)acrylate monomer, a carboxyl group-containing monomer, and an acrylamide-based monomer. Specifically, the intermediate adhesive polymer may be formed by polymerizing the monomers via the thermal polymerization and/or photopolymerization of the composition.

Further, according to an exemplary embodiment of the present invention, each of the first outer adhesive polymer and the second outer adhesive polymer may be formed by solution-polymerizing a composition including an alkyl group-containing (meth)acrylate monomer and a polar functional group-containing monomer. Specifically, the first outer adhesive polymer and the second outer adhesive polymer may be formed by polymerizing the monomers via the thermal polymerization and/or photopolymerization of the monomers.

According to an exemplary embodiment of the present invention, each of the intermediate adhesive polymer, the first outer adhesive polymer, and the second outer adhesive polymer may further include an additional material, such as a crosslinking agent, an initiator, and a tackifier, generally used in the art, if necessary.

In the present specification, the glass transition temperature (Tg) was measured by increasing the temperature at a heating rate of 5° C./min within a temperature range of −70° C. to 100° C. using a differential scanning calorimeter (DSC) (Q-1000, TA Instrument). In this case, the glass transition temperature was decided as the midpoint of the DSC curve.

According to an exemplary embodiment of the present invention, the glass transition temperature of the intermediate adhesive layer may be −40° C. or more and 0° C. or less, specifically, −40° C. or more and −15° C. or less, and more specifically, −40° C. or more and −20° C. or less, or −35° C. or more and −25° C. or less.

With the glass transition temperature of the intermediate adhesive layer being within the above range, the punchability of the multilayer adhesive tape may be improved, the multilayer adhesive tape may be easily handled, and the multilayer adhesive tape may have more improved step coverage.

According to an exemplary embodiment of the present invention, the glass transition temperature of each of the first outer adhesive layer and the second outer adhesive layer may be −60° C. or more and −20° C. or less, specifically, −60° C. or more and −30° C. or less, and more specifically, −60° C. or more and −40° C. or less, or −55° C. or more and −45° C. or less.

With the glass transition temperature of each of the first outer adhesive layer and the second outer adhesive layer being within the above range, the multilayer adhesive tape may implement excellent step coverage, and may minimize deterioration in punchability.

According to an exemplary embodiment of the present invention, the glass transition temperature of the intermediate adhesive layer may be higher than the glass transition temperatures of the first outer adhesive layer and the second outer adhesive layer. Therefore, the intermediate adhesive layer may have higher tensile force than each of the first outer adhesive layer and the second outer adhesive layer. Since the intermediate adhesive layer has relatively high glass transition temperature and tensile force, the multilayer adhesive tape is not cut off well when the multilayer adhesive tape is attached to an adherend, and then removed for reconstruction. Accordingly, the multilayer adhesive tape may be easily removed from the adherend. Specifically, the intermediate adhesive layer may serve to improve reworkability of the multilayer adhesive tape.

Furthermore, the first outer adhesive layer and the second outer adhesive layer have a low glass transition temperature and thus may implement high step coverage. Specifically, the first outer adhesive layer and the second outer adhesive layer may implement high fluidity due to the low glass transition temperature, and accordingly, the multilayer adhesive tape may be effectively embedded in a stepped part.

The multilayer adhesive tape may implement both high step coverage and excellent reworkability by including a plurality of adhesive layers having different physical properties. In particular, when the difference in glass transition temperature between each of the first outer adhesive layer and the second outer adhesive layer and the intermediate adhesive layer is 5° C. or more and 25° C. or less, the multilayer adhesive tape may exhibit the optimum performance.

According to an exemplary embodiment of the present invention, the intermediate adhesive layer may have a thickness of 30 μm or more and 100 μm or less, 30 μm or more and 80 μm or less, 40 μm or more and 70 μm or less, or 45 μm or more and 65 μm or less.

When the thickness of the intermediate adhesive layer is within the above range, the multilayer adhesive tape may have improved step coverage, and may effectively suppress white turbidity.

According to an exemplary embodiment of the present invention, the thickness of each of the first outer adhesive layer and the second outer adhesive layer may be 25 μm or more and 60 μm or less, 25 μm or more and 55 μm or less, 30 μm or more and 60 μm or less, 40 μm or more and 60 μm or less, 40 μm or more and 50 μm or less, or 45 μm or more and 55 μm or less.

When the thicknesses of the first outer adhesive layer and the second outer adhesive layer are within the above range, the multilayer adhesive tape may have excellent step coverage and long-term durability. Further, when the thicknesses of the first outer adhesive layer and the second outer adhesive layer are out of the above range, reworkability may be deteriorated, and low cohesive force may cause reduction in long-term durability.

According to an exemplary embodiment of the present invention, the total thickness of the multilayer adhesive tape may be 100 μm or more and 250 μm or less. Specifically, the total thickness of the multilayer adhesive tape may be 100 μm or more and 200 μm or less, or 120 μm or more and 170 μm or less.

When the total thickness of the multilayer adhesive tape is within the above range, the multilayer adhesive tape may simultaneously have high adhesiveness, step absorbability, and reworkability in spite of a small thickness.

According to an exemplary embodiment of the present invention, the first outer adhesive layer and the second outer adhesive layer may be formed by using a composition having the same composition. Furthermore, the thicknesses of the first outer adhesive layer and the second outer adhesive layer may be the same as each other.

According to an exemplary embodiment of the present invention, each of the thickness ratio of the first outer adhesive layer and the intermediate adhesive layer and the thickness ratio of the second outer adhesive layer and the intermediate adhesive layer may be 1:0.5 to 1:2, 1:0.7 to 1:2, or 1:0.7 to 1:1.5.

When the thickness ratio of the intermediate adhesive layer to each of the first outer adhesive layer and the second outer adhesive layer is within the above range, the multilayer adhesive tape has both excellent step coverage and excellent reworkability. Further, when the thickness ratio of the first or the second outer adhesive layer to the intermediate adhesive layer is out of the above range, leading to increase in the fraction of the outer adhesive layer in the thickness, punchability and reworkability when processing may deteriorate due to the too high thickness fraction of the relatively flexible outer adhesive layers. When the thickness ratio of the first or the second outer adhesive layers to the intermediate adhesive layer is out of the above range, leading to increase in the fraction of the intermediate adhesive layer in the thickness, step coverage may deteriorates due to the too high thickness fraction of the relatively hard intermediate adhesive layers.

When the thickness of the intermediate adhesive layer is within the above range and the above thickness ratio of the intermediate adhesive layer to each of the first outer adhesive layer and the second outer adhesive layer is maintained, the multilayer adhesive tape may have both excellent step coverage and excellent reworkability.

According to an exemplary embodiment of the present invention, the multilayer adhesive tape may further include: a first interface mixture layer provided between the first outer adhesive layer and the intermediate adhesive layer; and a second interface mixture layer provided between the second outer adhesive layer and the intermediate adhesive layer.

Specifically, the first interface mixture layer may include both a material constituting the first outer adhesive layer and a material constituting the intermediate adhesive layer. Further, the second interface mixture layer may include both a material constituting the second outer adhesive layer and a material constituting the intermediate adhesive layer.

FIG. 2 is a schematic view of a lamination structure of a multilayer adhesive tape according to an exemplary embodiment. Specifically, FIG. 2 illustrates a lamination structure of a multilayer adhesive tape in which a first interface mixture layer 301 is provided between the first outer adhesive layer 101 and the intermediate adhesive layer 201, and a second interface mixture layer 302 is provided between the intermediate adhesive layer 201 and the second outer adhesive layer 102.

According to an exemplary embodiment of the present invention, the multilayer adhesive tape may be prepared by sequentially laminating a first outer adhesive composition, an intermediate adhesive composition, and second outer adhesive composition, and then simultaneously curing, specifically, photocuring the compositions.

The first outer adhesive composition may constitute the first outer adhesive layer after curing, the intermediate adhesive composition may constitute the intermediate adhesive layer after curing, and the second outer adhesive composition may constitute the second outer adhesive layer after curing.

Specifically, the multilayer adhesive tape may be prepared by a method comprising laminating liquid-phase adhesive compositions, and then simultaneously curing the adhesive compositions, instead of a method comprising separately preparing respective layers, and then bonding the layers. Therefore, a liquid mixing region may be formed among the respective layers in the multilayer adhesive tape. The multilayer adhesive tape may secure excellent interlayer attaching force by the liquid mixing interval as compared to a general multilayer adhesive tape, and an interface separation phenomenon between layers in an extremely low temperature environment may be prevented.

According to an exemplary embodiment of the present invention, an interface layer caused by liquid mixing may be present at each of the interface between the first outer adhesive composition and the intermediate adhesive composition and the interface between the intermediate adhesive composition and the second outer adhesive composition. Specifically, the interface layer caused by liquid mixing at the interface between the first outer adhesive composition and the intermediate adhesive composition may constitute the first interface mixture layer. Further, the interface layer caused by liquid mixing at the interface between the intermediate adhesive composition and the second outer adhesive composition may constitute the second interface mixture layer.

According to an exemplary embodiment of the present invention, the first outer adhesive composition, the intermediate adhesive composition, and the second outer adhesive composition may be sequentially applied onto a substrate. In addition, the first outer adhesive composition, the intermediate adhesive composition, and the second outer adhesive composition may be simultaneously applied onto a substrate. As a method of applying the adhesive composition, a method generally used in the art, such as slot die and lip die, may be used.

According to an exemplary embodiment of the present invention, the thickness of the intermediate adhesive layer may be the shortest distance from the center of the first interface mixture layer to the center of the second interface mixture layer. In addition, the thickness of the first outer adhesive layer may be the shortest distance from the center of the first interface mixture layer to the outer side surface of the first outer adhesive layer. Furthermore, the thickness of the second outer adhesive layer may be the shortest distance from the center of the second interface mixture layer to the outer side surface of the second outer adhesive layer.

According to an exemplary embodiment of the present invention, the multilayer adhesive tape may be prepared by curing each of the intermediate adhesive composition and the outer adhesive compositions in the form of a film, and then joining these films. Specifically, the multilayer adhesive tape may be prepared by separately preparing the first outer adhesive layer, the intermediate adhesive layer, and the second outer adhesive layer in the form of a film, sequentially laminating these films, and then compressing the resulting laminate.

However, a preparation method of the multilayer adhesive tape is not limited to the preparation method, and the multilayer adhesive tape may be prepared by using a preparation method generally applied in the art.

The multilayer adhesive tape may be used for attaching various optical members such as a polarizing plate, a phase difference plate, an optical compensation film, a reflection sheet, a protection film, and a brightness-enhancing film. However, the use of the multilayer adhesive tape is not limited thereto, and the multilayer adhesive tape may be used without limitation for the use capable of being used in the art.

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to the person with ordinary skill in the art.

EXAMPLES, COMPARATIVE EXAMPLES, AND REFERENCE EXAMPLE

The intermediate adhesive compositions according to Examples 1 and 2, Comparative Examples 1 to 5, and Reference Example 1 were prepared as in the following Table 1.

Furthermore, based on 100 parts by weight of the composition, an outer adhesive composition including 88 parts by weight of 2-ethylhexyl acrylate, 10 parts by weight of tetrahydrofurfuryl methacrylate, and 2 parts by weight of acrylic acid was prepared.

The outer adhesive composition, the intermediate adhesive composition, and the outer adhesive composition were sequentially applied to a thickness of 45 μm, 60 μm, and 45 μm, respectively, and then simultaneously UV-cured, thereby preparing a multilayer adhesive tape sequentially including a first outer adhesive layer, an intermediate adhesive layer, and a second outer adhesive layer.

TABLE 1

|  | EHA (parts by weight) | IBOMA (parts by weight) | AA (parts by weight) | HBA (parts by weight) | DMAA (parts by weight) |
|---|---|---|---|---|---|
| Example 1 | 70 | 10 | 10 | 0 | 10 |
| Example 2 | 75 | 10 | 10 | 0 | 5 |
| Comparative Example 1 | 80 | 10 | 10 | 0 | 0 |
| Comparative Example 2 | 70 | 10 | 20 | 0 | 0 |
| Comparative Example 3 | 70 | 10 | 10 | 10 | 0 |
| Comparative Example 4 | 60 | 10 | 10 | 20 | 0 |
| Comparative Example 5 | 80 | 10 | 0 | 0 | 10 |
| Reference Example 1 | 60 | 10 | 10 | 0 | 20 |

*EHA: 2-ethylhexyl acrylate
*IBOMA: isobornyl methacrylate
*AA: acrylic acid
*HBA: hydroxybutyl acrylate
*DMAA: dimethyl acrylamide Experimental Example 1

The results of evaluating physical properties of the multilayer adhesive tapes prepared according to Examples 1 and 2, Comparative Examples 1 to 5, and Reference Example 1 are shown in the following Table 2.

TABLE 2

|  | White turbidity | Step coverage | Reworkability |
|---|---|---|---|
| Example 1 | ○ | ○ | ⊚ |
| Example 2 | ○ | ⊚ | ○ |
| Comparative Example 1 | X | ○ | Δ |
| Comparative Example 2 | X | ○ | ○ |
| Comparative Example 3 | ○ | Δ | Δ |
| Comparative Example 4 | ○ | X | ○ |
| Comparative Example 5 | Δ | ○ | ○ |
| Reference Example 1 | ⊚ | X | ⊚ |

Evaluation of White Turbidity

The prepared multilayer adhesive tape was attached onto a glass substrate having a thickness of 1.1 T, and a glass substrate having a thickness of 0.55 T was laminated on the multilayer adhesive tape, and then left to stand for 20 minutes in an autoclave under conditions of 40° C. and 4 bar. Next, a light source emitting a metal halide light with the energy of 3 J was positioned adjacent to the glass substrate having a thickness of 0.55 T, and then the glass substrate was exposed. Next, the white turbidity was evaluated by examining an area in which the white turbidity occurred in the entire area of the multilayer adhesive tape after leaving the glass substrate to stand for 3 days under conditions of 80° C. and 95 RH %, and to stand at room temperature for 30 minutes. Specifically, the case where an area in which the white turbidity occurred in the entire area of the multilayer adhesive tape was less than 10%, the case where an area in which the white turbidity occurred in the entire area of the multilayer adhesive tape was 10% or more and less than 30%, the case where an area in which the white turbidity occurred in the entire area of the multilayer adhesive tape was 30% or more and less than 50%, and the case where an area in which the white turbidity occurred in the entire area of the multilayer adhesive tape was 50% or more were evaluated as "⊚", "○", "Δ", and "x", respectively.

Evaluation of Step Coverage

The prepared multilayer adhesive tape was attached onto a glass substrate having a bezel part having a printing step of 20 μm and a screen part having no printing step, and a glass substrate having a thickness of 0.55 T was laminated thereon. Moreover, after the resulting laminate was left to stand for 20 minutes in an autoclave under conditions of 40° C. and 4 bar, the step coverage was evaluated by confirming the number of bubbles produced as a result of the failure to sufficiently overcome the step at four vertex portions of the bezel part and delayed bubbles at the screening part after 24 hours elapsed. Specifically, the case where the number of the delayed bubbles was 2 or less and no delayed bubbles occurred, the case where the number of the delayed bubbles was 2 to 3 and the delayed bubbles were slightly generated, the case where the number of the delayed bubbles was 3 to 4 and the delayed bubbles were prominently generated, and the case where the number of the delayed bubbles was 4 or more and the delayed bubbles were prominently generated were evaluated as "⊚", "○", "Δ", and "x", respectively.

Evaluation of Reworkability

When the prepared multilayer adhesive tape was attached onto a glass substrate, the substrate was left to stand for 20 minutes in an autoclave under conditions of 40° C. and 4 bar, and then the multilayer adhesive tape was removed, the case where the multilayer adhesive tape was completely removed without being cut off, the case where the multilayer adhesive tape was cut off, but the removing work was needed five times or less, the case where the multilayer adhesive tape was easily cut off, so that the removing work was needed six times or more, and the case where the multilayer adhesive tape was easily cut off and the removing work was impossible were evaluated as "⊚", "○", "Δ", and "x", respectively.

According to Table 2, it can be seen that in the case of Example 1 and Example 2 provided with an intermediate adhesive layer prepared by an adhesive composition including both a carboxyl group-containing monomer and an acrylamide-based monomer, the white turbidity is effectively prevented, as compared to Comparative Example 1 and Comparative Example 2 prepared by an adhesive composition including only a carboxyl group-containing monomer without an acrylamide-based monomer. Likewise, it can be seen that in the case of Example 1 and Example 2, the white turbidity is effectively prevented, as compared to Comparative Example 5 prepared by an adhesive composition including only an acrylamide-based monomer without a carboxyl group-containing monomer. In addition, it can be seen that in the case of Comparative Example 3 and Comparative Example 4 provided with an intermediate adhesive layer prepared by an adhesive composition including a carboxyl group-containing monomer and a hydroxyl group-containing monomer, the step coverage and/or the reworkability are/is low, as compared to Example 1 and Example 2.

Furthermore, it can be confirmed that Reference Example 1 is prepared by an adhesive composition including both a carboxyl group-containing monomer and an acrylamide-based monomer, but the content of the acrylamide-based monomer is extremely high, and as a result, the step coverage is low.

Reference Example 2

A multilayer adhesive tape was prepared in the same manner as in Example 1, except that the thickness of the intermediate adhesive layer was adjusted to 30 μm, and the thickness of each of the first outer adhesive layer and the second outer adhesive layer was adjusted to 60 μm.

Reference Example 3

A multilayer adhesive tape was prepared in the same manner as in Example 1, except that the thickness of the intermediate adhesive layer was adjusted to 100 µm, and the thickness of each of the first outer adhesive layer and the second outer adhesive layer was adjusted to 25 µm.

Experimental Example 2

The thickness of each layer and the results of evaluating physical properties of the prepared multilayer adhesive tapes in Example 1 and Reference Examples 2 and 3 in the same manner as in Experimental Example 1 are shown in the following Table 3.

TABLE 3

|  | Thickness of outer layer (µm) | Thickness of intermediate layer (µm) | Thickness of outer layer (µm) | White turbidity | Step coverage | Reworkability |
|---|---|---|---|---|---|---|
| Example 1 | 45 | 60 | 45 | ○ | ○ | ◎ |
| Reference Example 2 | 60 | 30 | 60 | Δ | ◎ | X |
| Reference Example 3 | 25 | 100 | 25 | ◎ | X | ◎ |

According to Table 3, it can be seen that in Reference Example 2, the thickness of the intermediate layer is extremely small as compared to the thickness of the outer adhesive layer, and as a result, the reworkability deteriorates. Further, it can be seen that in Reference Example 3, the thickness of the intermediate layer is extremely large as compared to the thickness of the outer adhesive layer, and as a result, the step coverage deteriorates.

EXPLANATION OF REFERENCE NUMERALS AND SYMBOLS

101: First outer adhesive layer
102: Second outer adhesive layer
201: Intermediate adhesive layer
301: First interface mixture layer
302: Second interface mixture layer

The invention claimed is:

1. A multilayer adhesive tape sequentially comprising:
a first outer adhesive layer;
an intermediate adhesive layer; and
a second outer adhesive layer,
wherein the intermediate adhesive layer comprises an intermediate adhesive polymer comprising: a polymerization unit of an alkyl group-containing (meth)acrylate monomer; a polymerization unit of a carboxyl group-containing monomer; and a polymerization unit of an acrylamide-based monomer,
wherein a glass transition temperature of the intermediate adhesive layer is higher than a glass transition temperature of each of the first and second outer adhesive layers,
wherein a difference in the glass transition temperature between each of the first outer adhesive layer and the second outer adhesive layer and the intermediate adhesive layer is from 5° C. to 25° C., and
wherein the first outer adhesive layer and the second outer adhesive layer each comprise an outer adhesive polymer comprising: a polymerization unit of a heterocycloalkyl group-containing (meth)acrylate monomer selected from the group consisting of tetrahydrofurfuryl acrylate (THFA), tetrahydrofurfuryl methacrylate, tetrahydropyranyl acrylate (THPA), or cyclictrimethylol-propaneformalacrylate (CTFA), and a polymerization unit of a crosslinkable monomer.

2. The multilayer adhesive tape of claim 1, wherein a content of the polymerization unit of the carboxyl group-containing monomer is from 1 part by weight to 15 parts by weight based on 100 parts by weight of the intermediate adhesive polymer.

3. The multilayer adhesive tape of claim 1, wherein a content of the polymerization unit of the acrylamide-based monomer is from 1 part by weight to 15 parts by weight based on 100 parts by weight of the intermediate adhesive polymer.

4. The multilayer adhesive tape of claim 1, wherein a weight ratio of the polymerization unit of the carboxyl group-containing monomer to the polymerization unit of a acrylamide-based monomer is 1:0.1 to 1:1.8.

5. The multilayer adhesive tape of claim 1, wherein a content of the polymerization unit of the crosslinkable monomer is from 1 part by weight to 30 parts by weight based on 100 parts by weight of the outer adhesive polymer.

6. The multilayer adhesive tape of claim 1, wherein the intermediate adhesive layer has a thickness of 30 µm or more and 100 µm or less.

7. The multilayer adhesive tape of claim 1, wherein the first outer adhesive layer and the second outer adhesive layer each have a thickness of from 25 µm to 60 µm.

8. The multilayer adhesive tape of claim 1, wherein a thickness ratio of the first outer adhesive layer to the intermediate adhesive layer and a thickness ratio of the second outer adhesive layer to the intermediate adhesive layer are each 1:0.5 to 1:2.

9. The multilayer adhesive tape of claim 1, further comprising:
a first interface mixture layer provided between the first outer adhesive layer and the intermediate adhesive layer; and
a second interface mixture layer provided between the second outer adhesive layer and the intermediate adhesive layer.

10. The multilayer adhesive tape of claim 1, wherein a total thickness of the multilayer adhesive tape is from 100 µm to 250 µm.

* * * * *